United States Patent Office 3,505,428
Patented Apr. 7, 1970

3,505,428
CURABLE NORMALLY STABLE COMPOSITIONS CONTAINING CROSS LINKING AGENT IN CAPSULE FORM
Alfred S. Kidwell, Mountain Lakes, and Norman R. Migdol, West Caldwell, N.J., assignors to Inmont Corporation, a corporation of Ohio
No Drawing. Filed Jan. 3, 1966, Ser. No. 517,919
Int. Cl. C08g 30/10; C08j 1/14; C08d 13/28
U.S. Cl. 260—831                                     3 Claims

ABSTRACT OF THE DISCLOSURE

Normally stable cross-linkable composition containing a liquid-linkable polymer having dispersed therein capsules consisting of a collapsible core carrying a plurality of particles of a solid cross-linking agent for the polymer and an outside wall of a polymeric film former which is insoluble in the polymer. The composition can be cured by breaking the friable capsules.

---

This invention relates to crosslinkable compositions which are normally stable but which contain unique capsules which may be broken to crosslink the compositions.

The crosslinkable components of the compositions are polymers which require catalysts or crosslinking agents in order to be crosslinked. The systems in which the compositions and unique capsules of this invention are particularly desirable are those in which the catalysts or crosslinking agents are so reactive with the polymers that the combination tends to undergo crosslinking even on standing at room temperature, and consequently the combinations are conventionally unstable and can not be marketed as a "one package" system. Among the crosslinkable polymers of which "one package" systems are notoriously unstable are epoxy resins formed by the reaction of epichlorohydrin and 2,2-diphenol propane, chloroprene rubber and polyurethanes. Such compositions crosslink and cure readily on storage even at room temperature. This has led to the general practice, when using the above-mentioned systems or any systems in which the polymers crosslink readily at room temperature in the presence of the catalysts, of using a "two-package" system in which it is necessary to mix the crosslinking agent and the polymer just prior to use. The disadvantages of such a procedure are obvious. Among them are the need to store and keep inventories of two separate items and more important, the requirement that the ultimate user also be a formulator. The results have to depend on the user's skill as a formulator.

We have now discovered a novel "one-package" normally stable but crosslinkable composition containing a liquid crosslinkable polymer having dispersed therein a plurality of the unique capsules of this invention. Each capsule comprises a collapsible core carrying a plurality of particles of the solid crosslinking agent for the polymer. The core and the particles are enclosed or encapsulated in a shell or wall of a polymeric film former. The wall or shell must of course be insoluble in the liquid polymer and is preferably readily breakable or removable. The composition is very stable. It may be stored for periods in excess of six months at ambient conditions. In addition, the composition retains all of the desirable properties of any conventional two-package system. When the composition is to be used, it is fed to any simple device for breaking the friable capsules such as a two-roll mill or a three-roll mill and then applied, after which it rapidly cures.

The term encapsulation as used in this invention is intended to mean fully enclosed and sealed within a continuous shell and should be distinguished from forms of coating of particles such as spray coating which are usually discontinuous.

For best results in the practice of this invention, it is preferred that a plurality of particles be encapsulated in each capsule. It is more difficult to break the friable shells or capsules surrounding single particles of curing agent than it is to break the shells of larger capsules containing more than one particle. In fact, it is most preferable to adhere a plurality of particles of the curing agent about a friable core and then to encapsulate this agglomerate in the shell of the film forming polymer. Such a capsule fractures readily and provides curing agent in finely divided form.

Advantageously the capsules are prepared using the fluidized bed technique and apparatus described in U.S. Patent 2,648,609 and in improvement Patent 3,117,027. When a friable core is used, the core particles are the fluidized bed in the apparatus and a slurry of the curing agent particles and a binder for adhering the particles to the core in a suitable solvent are applied to the core as a spray. Then, the procedure is repeated with the core carrying the bound particles of curing agent as the fluidized bed and the polymeric film former which is to be the capsule being applied in solvent as the spray.

It should be obvious to those skilled in the art that while the present invention is particularly advantageous in systems utilizing epoxy resins, chloroprene rubber and polyurethanes, the combination of virtually any crosslinkable liquid polymer and any crosslinking agent for said polymer may be used provided that the crosslinking agent is encapsulated in the unique capsules of this invention and the capsules dispersed in the liquid polymer. The principles of this invention are primarily mechanical, that is dependent on the structure of the capsule, e.g., the collapsible core, the particles of solid catalyst or the insolubility of the shell in the polymer to be crosslinked.

When the Epon epoxy resins, the polyurethanes and the chloroprene rubber are used in the practice of this invention, they are used in combination with conventional solid crosslinking agents for them which are encapsulated in our unique capsules. The proportions of crosslinkable polymer and crosslinking agents are the conventional proportions for the particular combination of agent and polymer.

The epoxy resins which are advantageously used in the systems of this invention are liquid resins produced by the reaction of a polyhydric phenol, particularly 2,2-diphenol propane with epichlorohydrin in accordance with the procedure of U.S. Patent 2,633,458. By regulating the proportions of the two reactants, the molecular size and molecular structure of the polyepoxide resins may be controlled. By using an excess of epichlorohydrin, a low molecular liquid weight polyepoxide resin may be produced. Other epoxy resins may be used such as glycidyl ethers of glycerine.

Among the conventional solid catalysts which may be used for the epoxy resins are piperazine including substituted piperazines such as 2-methyl piperazine and N-aminoethyl piperazine, p-phenylenediamine, 4,4'-diaminodiphenylamine, pyromellitic dianhydride, trimellitic anhydride, benzophenone, tetracarboxylic dianhydride.

In our chloroprene systems, we may employ conventional solid crosslinking agents for chloroprene such as metallic oxides including zinc, magnesium or lead oxides, piperazine, p-phenylene diamine, sulfur and 2-mercaptoimidazoline.

For the polyurethanes which may be either polyether or polyesterurethanes, conventional solid catalysts such as piperazine, p-phenylene diamine, 4,4'-methylene-bis- (2-chloroaniline) 3,3'-dichlorobenzidine, 4,4'-diaminodiphenylamine, 4,4'-methylenedianiline and hexamethylene diamine may be used.

The polymeric film former is a friable material which is insoluble in the liquid crosslinkable polymer. Some suitable polymers having these properties are lignin sulfonates such as calcium magnesium lignin sulfonate, maleic modified phenolformaldehyde, rosin modified phenolformaldehydes, pentaerythritol esters of hydrogenated rosin such as Pentalyn H and copolymers of alpha-methyl styrene and vinyl toluene.

When used, the core is preferably a friable material such as pumice, clay or other siliceous materials such as hollow glass spheres, hollow friable spheres of polymeric materials such as phenol-formaldehyde resins and fuller's earth. Alternatively, the core may be a distensible material such as rubber dust. The core may have a size range of from 20 to 800 microns and most preferably from 50 to 300 microns. The particles of curing agent have a particle size of 0.05 to 6 microns.

The binder used to bind the particles to the core should be a material which is soluble in the crosslinkable polymer for best results. Some suitable binders include Chlorowax (chlorinated paraffin wax) Aroclors (chlorinated biphenyls and triphenyls) and Piccopale 100 (a hydrocarbon resin, molecular weight 1400, iodine number 145 (Wijs) made by the polymerization of a mixture of alkene and diene monomers having an average molecular weight of 90).

The compositions of this invention are formulated so that the curing agent is present in conventional amounts, that is the curing agent is present in amounts preferably from 0.1 to 100% and most preferably from 2 to 30% of the weight of the crosslinkable polymer. In the capsule, the shell is of such a size that in the order of from 0.03 to 1.0 part of film former are preferably present for each part of curing agent. The core has the proportions set forth above. Preferably from 0.05 to 1.0 part of the binder for each part of curing agent are used to bind the particles to the core.

In the present specification and claims, all proportions are by weight unless otherwise indicated.

The following examples will illustrate the practice of this invention.

EXAMPLE 1

Using the apparatus shown in U.S. Patent No. 3,117,027, 600 g. of pumice particles having an average particle diameter of 200–300 microns are coated with a slurry of 3200 g. piperazine, 1600 g. Arochem 455 (maleic modified phenol-formaldehyde resin having an acid number of 60–90 and a M.P. of 135–145° C.), 1200 g. acetone and 3,600 g. methanol. The pumice particles are maintained as the fluidized bed upon which the slurry is sprayed. The fluidized bed is maintained by hot air at a temperature of about 120°–180° F. During the coating, the acetone and methanol evaporate leaving a coating on the pumice particles of piperazine bound to the pumice by the Arochem 455. The coated particles are removed from the apparatus and passed through a 16 mesh screen to remove any agglomerates.

Then, using the same apparatus, the coated pumice cores are next encapsulated by forming a fluidized bed of the coated cores and spraying a slurry of 500 g. of calcium magnesium lignin sulfonate, 50 g. glycerine, 450 g. kaolin clay and 3,000 g. of water. The fluidized bed is maintained by hot air at a temperature of about 170°–180° F. About 2 parts of slurry are sprayed for each part by weight of the coated cores. During the process, the water evaporates leaving a capsule predominantly of calcium magnesium lignin sulfonate and clay around the coated core. The resulting capsules have a diameter in the range of 300 to 600 microns.

The above capsule may be prepared without the kaolin clay, that is by repeating the above step of encapsulating the coated core using the same ingredients except for the eliminated clay. The capsule would be of a slightly lower stability but still utilizable in this invention.

EXAMPLE 2

Example 1 is repeated using the same procedure, ingredients, proportions and conditions except that the pumice particles are coated with a slurry of 3860 g. p-phenylene diamine, 430 g. Arochem 455, 5250 g. methanol and 1750 g. acetone.

EXAMPLE 3

Example 1 is repeated using the same procedure, ingredients, proportions and conditions except that the pumice particles are coated with a slurry of 1600 g. zinc oxide, 800 g. magnesium oxide, 2400 g. of Piccopale 100 (a hydrocarbon resin having a molecular weight of 1400, an iodine number of 145 (Wijs) made by the polymerization of a mixture of molecules having an average molecular weight of 90, composed essentially of dienes and reactive olefins) and 5600 g. of toluene.

EXAMPLE 4

48 parts by weight of the composition of Example 1 are dispersed in 100 parts of Epon 828 (an epoxy resin formed by the reaction of 2,2-diphenol propane and epichlorohydrin having an average molecular weight of about 360 and an epoxide equivalent weight of about 190). The resulting composition is very stable. After over 6 months storage at room temperature, no change is noted and the composition is still stable. After storage at 130° F. for over a month, the composition remained stable with no detrimental change.

In order to use and cure the composition, it is passed to an apparatus for mechanically crushing the capsules such as a two-roll mill. The composition is then applied, for example as an adhesive between two steel parts. The composition cures to a tough hard material having all of the desirable properties of cured epoxy resin compositions in which the piperazine is mixed with the epoxy resin just prior to curing.

EXAMPLE 5

Example 4 is repeated using the same procedure, ingredients, proportions and conditions except that 11.2 parts of the composition of Example 2 are dispersed in 50 parts of Epon 828 and 3.5 parts of fumed colloidal silica (to aid the stability of the dispersion). The composition has at least as good a stability as the composition of Example 4 and may be cured as effectively as the composition of Example 4, if the composition is heat cured in the conventional manner for aromatic amines.

EXAMPLE 6

Example 4 is repeated using the same procedure, ingredients, proportions and conditions except that 30 parts of the composition of Example 2 are dispersed in 400 parts of a liquid polyether urethane, produced from tolylene diisocyanate and polytetramethylene ether glycol, having a molecular weight of about 2,000 and an isocyanate content of 4.0 to 4.3% as terminal groups and 20 parts of fumed colloidal silica. The composition has as good a stability as the composition of Example 4 and may be cured as effectively as the composition of Example 4.

EXAMPLE 7

Example 4 is repeated using the same procedure, ingredients, proportions and conditions except that 30 g. of the composition of Example 3 are dispersed in the following:

Parts by weight
Polychloroprene having an average molecular
  weight of 8,000–12,000 _____ 100
Carbon black _____ 58

| | Parts by weight |
|---|---|
| Stearic acid | 0.5 |
| N-phenyl-beta-naphthylamine | 2.0 |

The composition has as good a stability as the composition of Example 4 and may be cured as effectively as the composition of Example 4.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:

1. A normally stable composition consisting of a liquid crosslinkable polymer having dispersed therein a plurality of friable capsules, each capsule consisting of a collapsible core having adhered thereto a plurality of particles of a crosslinking agent for said polymer and an outside wall of a polymeric film former which is insoluble in the polymer completely encapsulating said core and particles, said polymer being curable upon the breakage of said capsules.

2. The composition of claim 1 wherein said crosslinkable polymer is a 1,2-epoxy resin.

3. The composition of claim 2 wherein said epoxy resin is formed by the reaction of 2,2-diphenol propane and epichlorohydrin.

References Cited

UNITED STATES PATENTS

| 2,651,589 | 9/1953 | Shokal et al. | 154—140 |
| 2,800,457 | 7/1957 | Green et al. | 252—316 |
| 2,800,458 | 7/1957 | Green | 252—316 |
| 3,063,965 | 11/1962 | Colclough | 260—59 |
| 3,352,700 | 11/1967 | Biskup | 106—123 |
| 3,018,258 | 1/1959 | Meier et al. | 260—6 |
| 3,116,206 | 12/1963 | Brynko et al. | 260—8 XR |
| 3,384,680 | 5/1968 | Lussow | 260—47 XR |
| 3,395,105 | 7/1968 | Washburn et al. | 260—9 XR |
| 3,396,117 | 8/1968 | Schuetze | 260—47 XR |

OTHER REFERENCES

Murray and Thompson "The Neoprenes," p. 93 E. I. du Pont, March 1963.

Saunders and Frisch, "Polyurethanes, Chemistry and Technology Part II, Technology," pp. 302–303, vol. XVI, of "High Polymers," Interscience 1964.

"NCR Capsules Have Wide Possibilities," pp. 14–16 NCR Factory News, October 1959.

WILLIAM SHORT, Primary Examiner

E. NIELSEN, Assistant Examiner

U.S. Cl. X.R.

260—3, 5, 24, 25, 28, 28.5, 823, 831, 837, 838, 844, 841, 890, 96, 47, 41.5, 33.6 17.5